US011307447B2

(12) United States Patent
Chen et al.

(10) Patent No.: US 11,307,447 B2
(45) Date of Patent: Apr. 19, 2022

(54) DISPLAY DEVICE

(71) Applicant: InnoLux Corporation, Miao-Li County (TW)

(72) Inventors: Yung-Chih Chen, Miao-Li County (TW); Ming-Feng Hsieh, Miao-Li County (TW); Yen-Shuo Chen, Miao-Li County (TW); Chung-Cheng Huang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 70 days.

(21) Appl. No.: 16/851,599

(22) Filed: Apr. 17, 2020

(65) Prior Publication Data

US 2020/0348558 A1 Nov. 5, 2020

(30) Foreign Application Priority Data

Apr. 30, 2019 (CN) ........................ 201910360087.6

(51) Int. Cl.
*G02F 1/1335* (2006.01)
*G02F 1/1333* (2006.01)

(52) U.S. Cl.
CPC .. *G02F 1/133512* (2013.01); *G02F 1/133308* (2013.01); *G02F 1/133314* (2021.01); *G02F 2202/28* (2013.01)

(58) Field of Classification Search
CPC ......... G02F 1/133314; G02F 1/133317; G02F 1/133512; G02F 1/13332; G02F 1/133504; G02F 1/133507; G02F 1/13356; G02F 1/133562
USPC ........................................ 349/110, 112, 153
See application file for complete search history.

(56) References Cited

U.S. PATENT DOCUMENTS 6,483,482 B1 11/2002 Kim
9,588,264 B2 3/2017 Etienne et al.
2002/0054253 A1* 5/2002 Cho ................. G02F 1/133512 349/110
2008/0049165 A1* 2/2008 Min ..................... G02B 3/0043 349/64
2013/0050613 A1 2/2013 Ohshima
2014/0098513 A1* 4/2014 Yi .......................... G02B 5/003 362/19
2014/0240641 A1* 8/2014 Kang ............... G02F 1/133615 349/62
2016/0070138 A1 3/2016 Chen et al.
(Continued)

FOREIGN PATENT DOCUMENTS

CN 1275760 A 12/2000
CN 103988118 A 8/2014

*Primary Examiner* — Edward J Glick
*Assistant Examiner* — David Y Chung
(74) *Attorney, Agent, or Firm* — McClure, Qualey & Rodack, LLP

(57) ABSTRACT

A display device including a display panel having a top surface, a side surface, a light shielding component, and an optical film is provided. The side surface is adjacent to the top surface. The light shielding component has a first part and a second part. The first part is disposed on the top surface of the display panel. The second part is disposed on the side surface of the display panel. The optical film at least covers the border between the top surface of the display panel and the first part of the light shielding component. The width of the first part of the light shielding component is less than 1 mm.

17 Claims, 13 Drawing Sheets

10322
P2' P2 $\theta_{P2}$
1032
1030
103
1031
108
$P2_4$ $P2_3$ $T_{103}$
P1 $P1_2$ $P1_1$ $\theta$
1021
$101_1$ $\theta_{P1}$ 10311 $W_{1021}$
1022
$101_2$
101 L1 BM
$W_{BM}$
Y X

(56) References Cited

U.S. PATENT DOCUMENTS

2016/0374193 A1* 12/2016 Namkung ............. G02F 1/1333
2017/0276993 A1 9/2017 Lo et al.
2018/0113353 A1* 4/2018 Chen ................. G02F 1/133528

* cited by examiner

DISPLAY DEVICE

CROSS REFERENCE TO RELATED APPLICATIONS

This application claims priority of Chinese Patent Application 201910360087.6, filed on Apr. 30, 2019 the entirety of which is incorporated by reference herein.

BACKGROUND

Technical Field

The present disclosure relates to a display device, and in particular it relates to a display device suitable for a narrow frame.

Description of the Related Art

With the development of various electronic devices, the demand for electronic displays has gradually increased. In general, a display frame has visible frame lines and thickness, affecting on the appearance and user visual experience. Therefore, current displays still need further improvement.

SUMMARY

In accordance with some embodiments of the present disclosure, a display device is provided. The display device includes a display panel having a top surface, a side surface, a light shielding component, and an optical film. The side surface is adjacent to the top surface. The light shielding component has a first part and a second part. The first part is disposed on the top surface of the display panel. The second part is disposed on the side surface of the display panel. The optical film at least covers the border between the top surface of the display panel and the first part of the light shielding component. The width of the first part of the light shielding component is less than 1 mm.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1:
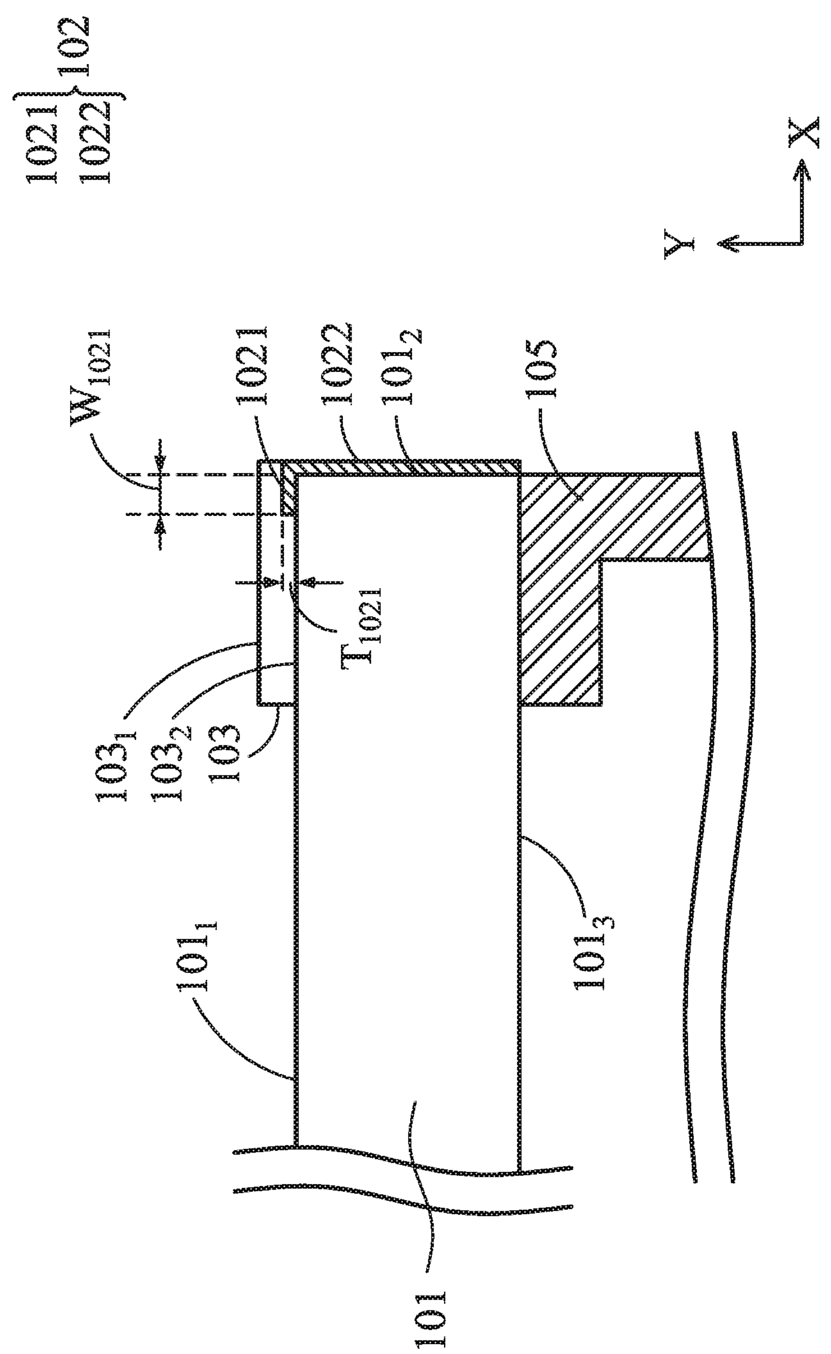
FIG. 1 is partial cross-sectional diagrams of the display device in accordance with an embodiment of the present disclosure.

The display device of the present disclosure is described in detail in the following description. It should be understood that, in the following detailed description, various embodiments and examples are provided in order to implement the different aspects of some embodiments of the present disclosure. The specific elements and configurations described in the following detailed description are set forth in order to clearly describe some embodiments of the present disclosure. Of course, these are only used as examples and not as a limitation of the disclosure. In addition, like and/or corresponding numerals may be used in different embodiments to denote like and/or corresponding elements in order to clearly describe the present disclosure. However, the use of like and/or corresponding numerals are merely for the purpose of simplicity and clarity of the disclosure, and are not intended to suggest any correlation between different embodiments and/or structures discussed.

It should be understood that the elements or devices in the drawings may be present in any form or configuration known to those with ordinary skill in the art. In addition, relative terms such as “under”, “lower” or “bottom” or “above”, “higher” or “top” may be used in the embodiments to describe the relative relationship of one element of the drawing to another. It should be understood that if the device in the drawing is flipped upside down, the element described on the “lower” side will become the element on the “higher” side. It should also be understood that the term “cover over . . . ” or similar terms in the present disclosure may be directly in contact with the covered object, or can also be above the covered object, such that projections of the covering object and the covered object have overlapping parts, but not directly in contact with the covered object. Unless explicitly stated as direct contact, the term “contact” in the present disclosure generally includes a direct contact or an indirect contact.

The embodiments of the present disclosure can be understood in conjunction with the drawings, and the drawings of the present disclosure are also considered as part of the disclosure. It should be understood that the drawings of the present disclosure are not drawn to scale. In fact, the size of the elements may be arbitrarily enlarged or reduced in order to clearly present the features of the present disclosure. In addition, to simplify the drawing, some conventional structures and elements in the drawings are illustrated in a simple schematic manner, and for clarity in each schematic cross-sectional diagram, the cross-hatching of a part of element can be omitted. It can also be understood that, for the sake of clarity, only some of elements are illustrated in the drawings, but those with ordinary skill in the art may add additional elements according to needs.

Furthermore, the elements or devices in the drawings of the present disclosure may be present in various forms known to those with ordinary skill in the art. In addition, it should be understood that, although the terms "first", "second" etc. may be used herein to describe various elements, components, or portions, these elements, components, or portions should not be limited by these terms. These terms are only used to distinguish different elements, components, regions, layers, or portions. Thus, a first element, component, region, layer, or portion discussed below could be termed a second element, component, region, layer, or portion without departing from the teachings of the present disclosure.

Here, the terms "about", "approximate", "approximately", "substantial", "substantially" usually means within 5%, 3%, 2%, 1% or 0.5% of a given value or range. Here, the given value is an approximate number. That is, in the absence of a specific description of "about", "approximate", "approximately", "substantial", "substantially", the meaning of "about", "approximate", "approximately", "substantial", "substantially" may still be implied.

With the development of various electronic devices, the demand for electronic displays has gradually increased. In addition to the size of the display screens used in electronic products such as mobile phones, tablet devices, notebook computers etc., the demand for large display screens and even very large display screens for special occasions has increased. Realizing the large display screens by means of "tiling" is one of the main means. That is, a plurality of smaller display devices are used as tiling units, and combined to generate the desired tiled display device. Therefore, the present disclosure discloses methods for improving the appearance of the display device, decreasing the gaps between the tiling units of the tiled display device, or improving the overall visual experience.

Referring to FIG. 1, which is a partial cross-sectional diagram of the display device in accordance with some embodiments of the present disclosure. In some embodiments, the display device may include a display panel 101, a light shielding component 102, and an optical film 103. The display panel 101 has a top surface $\mathbf{101}_1$, a side surface $\mathbf{101}_2$ adjacent to the top surface $\mathbf{101}_1$, and a lower surface $\mathbf{101}_3$ opposite the upper surface $\mathbf{101}_1$. The top surface $\mathbf{101}_1$ is a viewing surface of the display device. The light shielding component 102 is disposed at an edge of the display panel 101, and the light shielding component 102 has a first part 1021 and a second part 1022. The first part 1021 of the light shielding component 102 is a portion located on the top surface $\mathbf{101}_1$, and the other portion of the light shielding component 102 is the second part 1022. The first part 1021 of the light shielding component 102 is disposed on the top surface $\mathbf{101}_1$ of display panel 101, and the second part 1022 of the light shielding component 102 is disposed on the side surface $\mathbf{101}_2$ of display panel 101. In some embodiments, the first part 1021 is in contact with the top surface $\mathbf{101}_1$, and/or the second part 1022 is in contact with the side surface $\mathbf{101}_2$, but is not limited thereto. In other embodiments, other layers may be disposed between the light shielding component and the top surface $\mathbf{101}_1$ or the side surface $\mathbf{101}_2$. In some embodiments, the first part 1021 and the second part 1022 of the light shielding component 102 are connected directly, and thus may have an L shape in the schematic cross-sectional diagrams. In some embodiments, the first part 1021 and the second part 1022 of the light shielding component 102 are substantially the same thickness. The first part 1021 of the light shielding component 102 has a width $W_{1021}$, and the width $W_{1021}$ may be greater than 0 millimeters (mm) and less than 1 mm, or may be less than 0.5 mm. The width $W_{1021}$ may be defined as the maximum width of the first part 1021 in the X direction. The maximum width described above may be the maximum width in any of the top view images of the display device. The first part 1021 of the light shielding component 102 has a thickness $T_{1021}$, and the thickness $T_{1021}$ may be greater than 0 micrometers (μm) and may be less than 200 μm, less than 100 μm, or less than 50 μm. The thickness $T_{1021}$ may be defined as the maximum thickness of the first part 1021 in the Y direction. The maximum thickness described above may be the maximum thickness in any of the cross-sectional images of the display device. The Y direction is defined as the normal direction of the display panel 101, and the X direction is defined to be perpendicular to the Y direction. In some embodiments, the second part 1022 of the light shielding component 102 may cover at least part of the side surface $\mathbf{101}_2$ of the display panel 101. In some embodiments, the second part 1022 of the light shielding component 102 may cover the entire side surface $\mathbf{101}_2$ of the display panel 101, that is, the second part 1022 of the light shielding component 102 completely covers the side surface $\mathbf{101}_2$ of the display panel 101.

Still referring to FIG. 1, the optical film 103 in the display device is disposed on a part of the top surface $\mathbf{101}_1$ of the display panel 101 and the first part 1021 of the light shielding component 102, and the optical film 103 covers a border between the top surface $\mathbf{101}_1$ and the first part 1021. A top surface $\mathbf{103}_1$ of the optical film 103 away from the display panel 101 may be a substantially flat surface, or may be, for example, a non-planar surface having a step or the like. In some embodiments, a side of the optical film 103 adjacent to the second part 1022 of the light shielding component 102 may be adjacent to an outermost side of the second part 1022 along the X direction or substantially flush (coplanar) with the outermost side of the second part 1022, but is not limited thereto. The terms "substantially flush with", "substantially coplanar with" or similar terms used herein to refer to the maximum difference between the two planes is less than 100 μm. By covering the border between the top surface $\mathbf{101}_1$ and the first part 1021 by the optical film 103, peeling or warping of the edge of the first part 1021 of the light shielding component 102 may be reduced, the durability of the light shielding component 102 may be increased.

The optical film 103 may be made of a suitable material, such as polyethylene terephthalate (PET), polycarbonate (PC), poly(methyl methacrylate) (PMMA), polyimide (PI), polystyrene (PS) or the like. The optical film 103 may be made of a single material, a mixed material, a single layer, or a multilayer.

The light shielding component 102 may be used to shield against light leakage from the edge of the display panel 101 or may be used to shield a part of the wiring area in the display panel 101. In some embodiments, the light shielding component 102 may include ink or a thin-layer support. The ink may be a photocurable ink or a thermosetting ink. The material of the thin-layer support can be a metal film, a Mylar film, a metal-containing Mylar film, a combination thereof, or another suitable light shielding material with the desired width and/or thickness. In some embodiments, the light shielding component 102 may be formed of Al-Mylar film, for example a film of PET/Al/PET. The light shielding component 102 made of a suitable material may have an ultra narrow and/or ultra thin first part 1021, so that even if the display is tiled, the viewer is less likely to perceive the presence of the first part 1021.

The display device may have other structures, such as a support member 105 disposed on a side of the display panel 101 away from the top surface 101$_1$ in FIG. 1, to support the display panel 101. In some embodiments, the support member 105 is disposed on a side adjacent to the lower surface 101$_3$ of the display panel 101, and attached to the lower surface 101$_3$ of the display panel 101.

Figure 2:
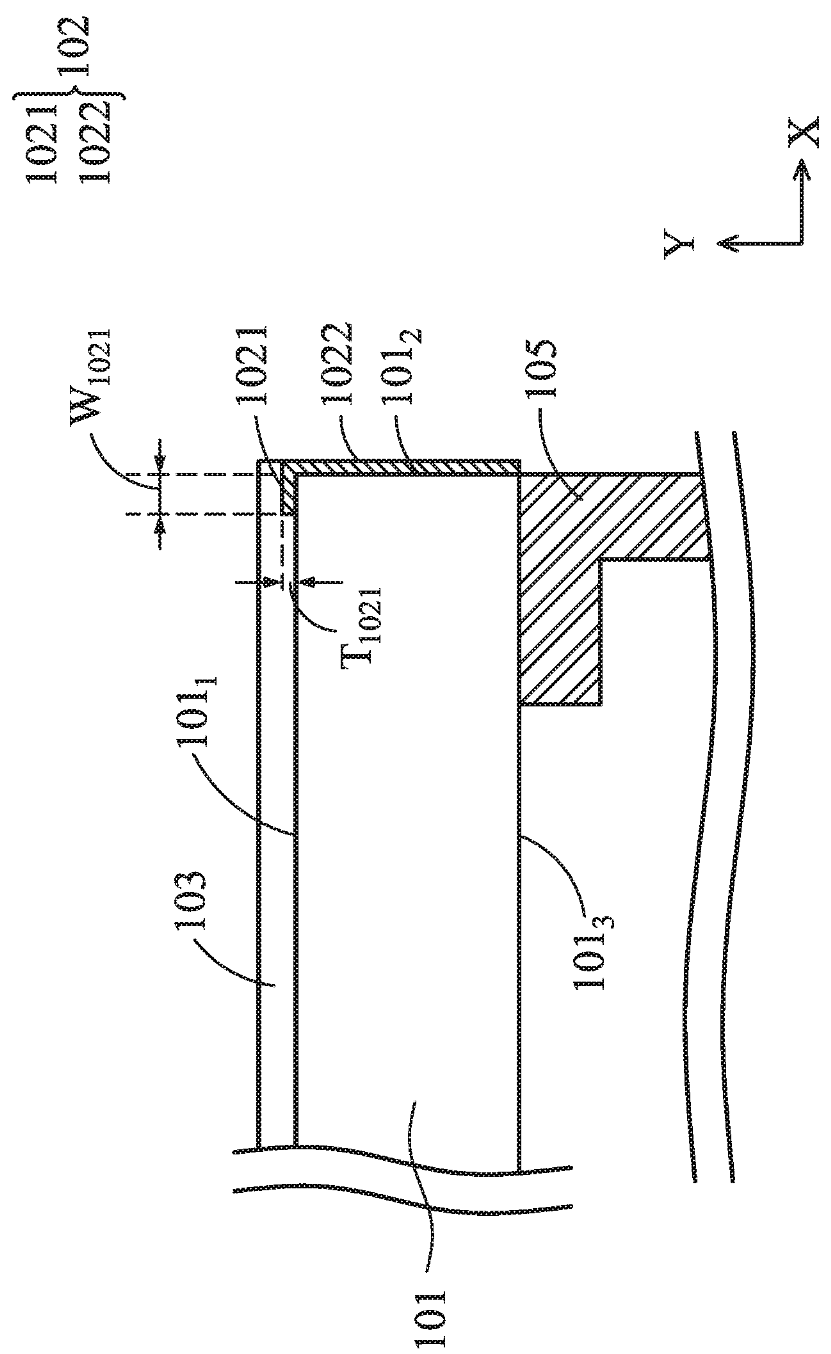
FIG. 2 is partial cross-sectional diagrams of the display device in accordance with an embodiment of the present disclosure.

Referring to FIG. 2, which is a partial cross-sectional diagram of the display device in accordance with some embodiments of the present disclosure. Compared to FIG. 1, the area of the top surface 101$_1$ of the display panel 101 covered by the optical film 103 of the display device in FIG. 2 is larger than that of the top surface 101$_1$ of the display panel 101 covered by the optical film 103 in FIG. 1. In one embodiment, the optical film 103 at least partially covers the top surface 101$_1$ of the display panel 101 and the first part 1021 of the light shielding component 102. Therefore, when the display device is viewed from the top, the area of the optical film 103 may be greater than or equal to that of the top surface 101$_1$ of the display panel 101. In one embodiment, the optical film 103 completely covers the top surface 101$_1$ of the display panel 101 and the first part 1021 of the light shielding component 102 using a full-surface bonding. In addition, a side of the optical film 103 adjacent to the second part 1022 of the light shielding component 102 is close to or substantially coplanar with the outside of the second part 1022. Since the optical film 103 at least partially covers the top surface 101$_1$ and the first part 1021, the viewing surface of the display device is visually flatter, and the top surface 101$_1$ of the display panel 101 and the first part 1021 of the light shielding component 102 may be more protected.

The display panel 101 used in the display device is not particularly limited, and may include, for example, a liquid-crystal (LC), an organic light-emitting diode (OLED), a quantum dot (QD), a quantum-dot light-emitting diode (QLED), a QD-LED, a fluorescent material, a phosphor material, a light-emitting diode (LED), a micro light-emitting diode, a mini light-emitting diode, another material, or a combination thereof, but is not limited thereto.

Figure 3:
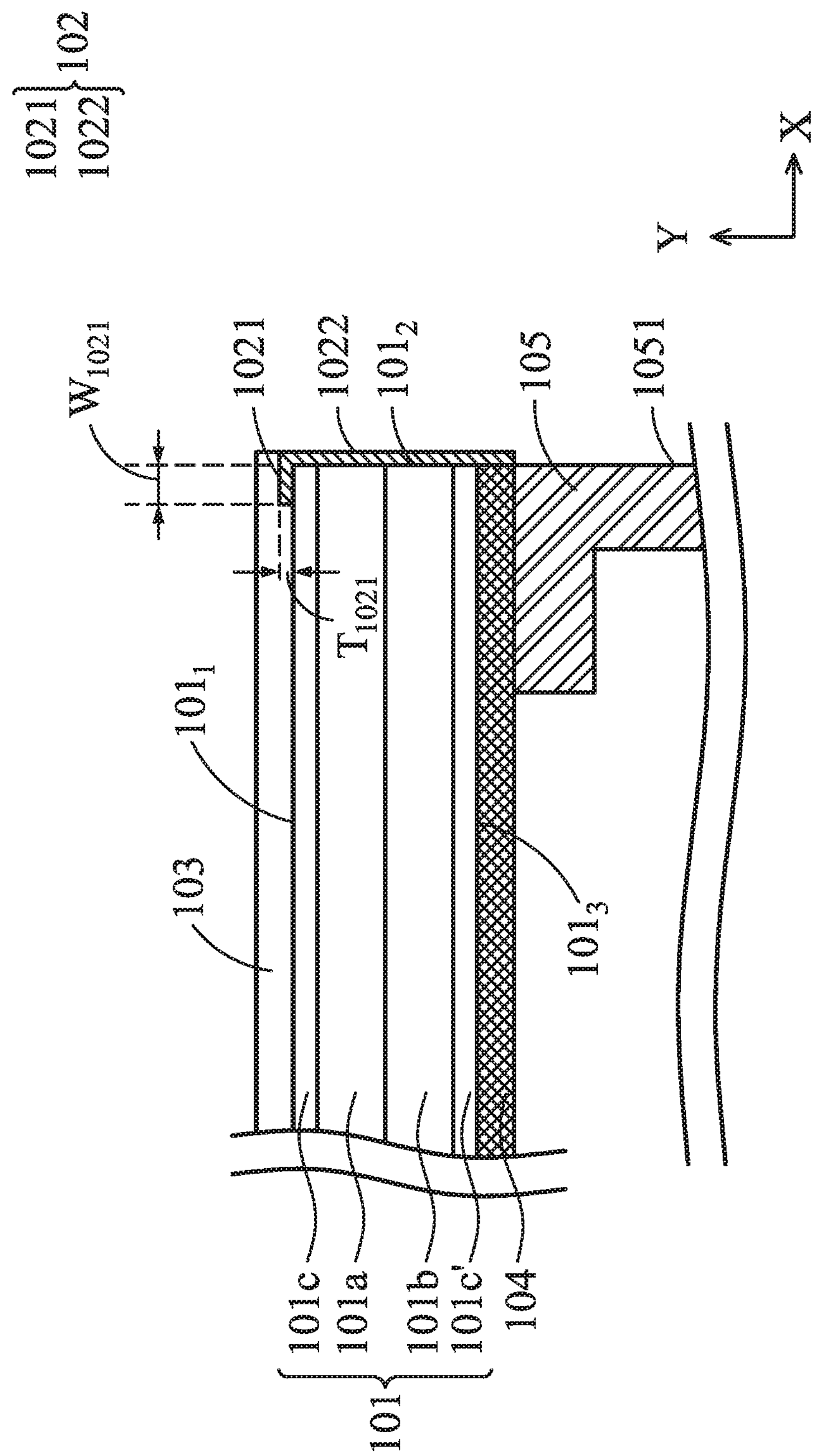
FIG. 3 is partial cross-sectional diagrams of the display device in accordance with an embodiment of the present disclosure.

For example, as shown in FIG. 3, the display panel 101 in the display device may be a liquid-crystal display having a color filter substrate 101*a*, a thin film transistor substrate 101*b*, and polarizing films 101*c* and 101*c*'. In the direction from the top surface 101$_1$ to the lower surface 101$_3$ of the display panel 101, the polarizing film 101*c*, the color filter substrate 101*a*, the thin film transistor substrate 101*b*, and another polarizing film 101*c*' are sequentially arranged in the liquid-crystal display. In some embodiments, there may be other functional film layer 104 on the lower surface 101$_3$ of the display panel 101. For example, the functional film layer 104 may be a diffusing film such that the backlight of the liquid-crystal display may be a uniform surface light source. For example, the functional film layer 104 may be a prism sheet or a brightening film, which may improve the brightness utilization rate of the liquid-crystal display or generate the effect of lower energy consumption. The functional film layer 104 may be a single layer or a multilayer, or may be a combination of the diffusion film, the prism sheet, or the brightening film, but is not limited thereto.

In some embodiments, the support member 105 in the display device may be an opaque element, a translucent element or a transparent element (relative to visible light). When the display panel 101 is a non-self-illuminating display and has a backlight, the translucent or transparent support member 105 can reduce the shadow generated from a periphery of the display device or may make the brightness of overall image be more uniform. When the support member 105 is the translucent or transparent support member, there may be a reflection sheet on an outermost surface 1051 of the support member 105, the reflection sheet may reflect the light emitted from the light source to the outermost surface 1051 to the viewing surface, and the light output amount emitted from the display device may be further increased. For example, the reflection sheet may be formed of metal, but is not limited thereto.

Figure 4:
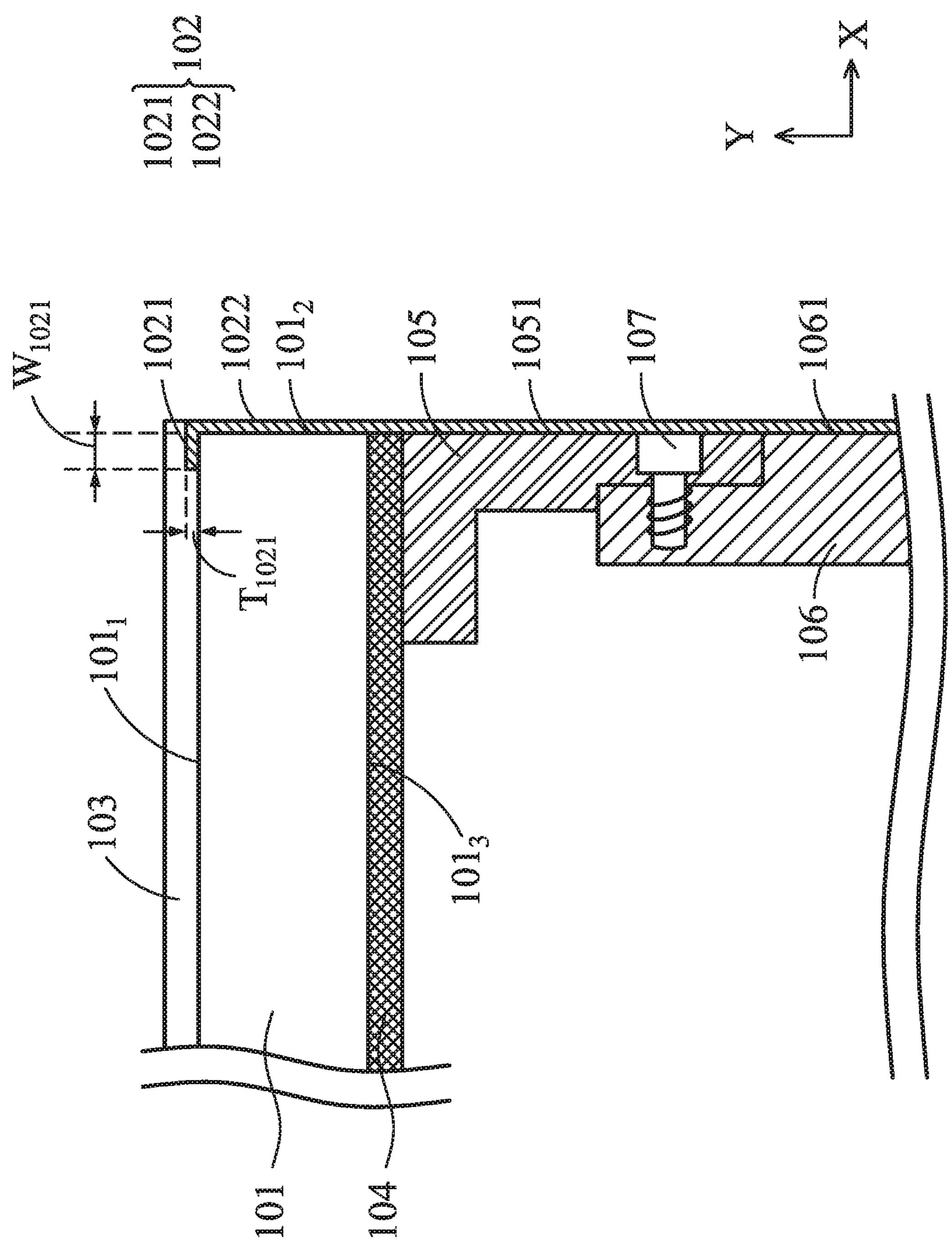
FIG. 4 is partial cross-sectional diagrams of the display device in accordance with an embodiment of the present disclosure.

Referring to FIG. 4, the display device may further include a back frame 106 and a fixing mechanism 107. In some embodiments, the back frame 106 may be a metal back frame. In some embodiments, the back frame 106 is disposed on a side of the lower surface 101$_3$ of the display panel 101, the support member 105 is disposed between the display panel 101 and the back frame 106, and the back frame 106 is disposed adjacent to the support member 105. The support member 105 overlaps the back frame 106 in the X direction. That is, when the display device is viewed along the X direction, a side wall of the support member 105 and a side wall of the back frame 106 at least partially overlap. The fixing mechanism 107 may be disposed at an overlapping portion of the support member 105 and the back frame 106, and the support member 105 and the back frame 106 are affixed to each other by the fixing mechanism 107. The fixing mechanism 107 is not particularly limited as long as it is a mechanism fixed the support member 105 and the back frame 106. In some embodiments, the fixing mechanism 107 may be a screw, a bolt, a snap structure, a cassette structure or other suitable element, or a combination of the above elements, but is not limited thereto.

Still referring to FIG. 4, in some embodiments, the side surface 101$_2$ of the display panel 101, the outermost surface 1051 of the support member 105, and an outermost surface 1061 of the back frame 106 are substantially coplanar. In some embodiments, when the light shielding component 102 is a thin-layer support, the second part 1022 of the support member 102 may further extend to cover the back frame 106 except for covering the side surface 101$_2$ of the display panel 101. That is, the second part 1022 of the support member 102 covers a border between the display panel 101 and the support member 105. When the light shielding component 102 is the thin-layer support, the overall strength of the display device may be increased by attaching and covering borders between each of the components, and the display device may have a certain strength without requiring an additional metal front frame. In some embodiments, since the optical film 103 may enhance the adhesion between the display panel 101 and the light shielding component 102 by a full-surface bonding, and the fixity of the light shielding component 102 may be increased, and thus improving the overall strength of the display device. Therefore, the optical film 103 and the light shielding component 102 also may be used as a reinforcing structure together.

Figure 5:
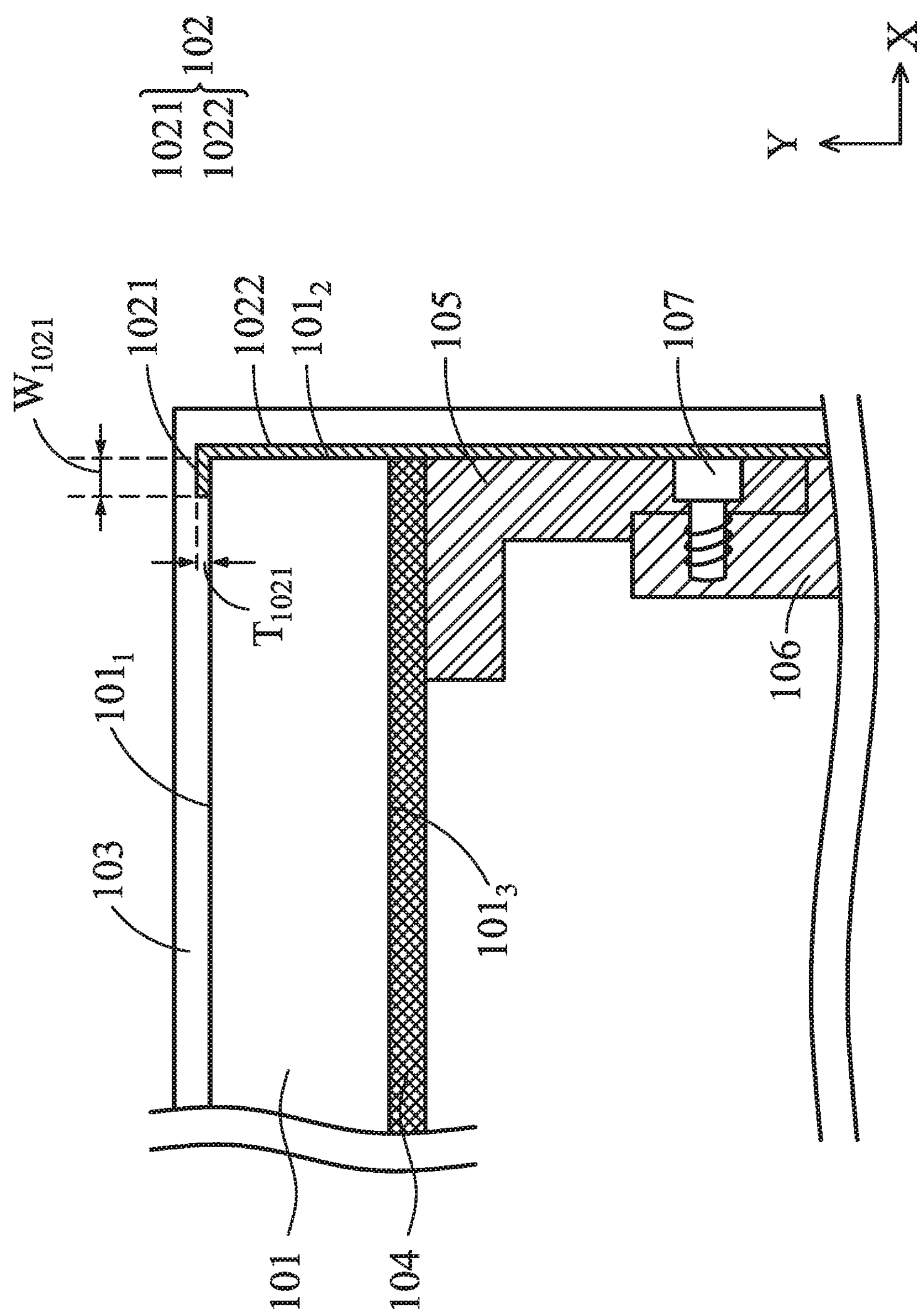
FIG. 5 is partial cross-sectional diagrams of the display device in accordance with an embodiment of the present disclosure.

Referring to FIG. 5, the display device of FIG. 5 is similar to that of FIG. 4, except that the optical film 103 may be further extended to cover the second part 1022 of the light shielding component 102, and may also be regarded as the optical film 103 being on the side surface 101$_2$ of the display panel 101. In other embodiments, the optical film 103 may be further extended to cover the support member 105, that is, the optical film 103 covers the border between the display panel 101 and the support member 105, such that the optical film 103 is disposed corresponding to the support member 105, that is, when viewed from the side of the display panel 101 (for example, along the X direction), the optical film 103 partially overlaps the support member 105. The display panel 101, the light shielding component 102, and the support member 105 may be more firmly fixed by increasing the attachment range of the optical film 103. In other embodiments, the optical film 103 may be further extended to cover the back frame 106, and the optical film 103 covers the border between the support member 105 and the back frame 106, such that the optical film 103 is disposed corresponding to the back frame 106, that is, when viewed from the side of the display panel 101 (for example, along the X direction), the optical film 103 partially overlaps the back frame 106. In term of the process, since the optical film 103 may be attached to the top surface $\mathbf{101}_1$ of the display panel 101 without precise alignment, the yield of the process may be improved and/or the process complexity may be reduced.

Figure 6:
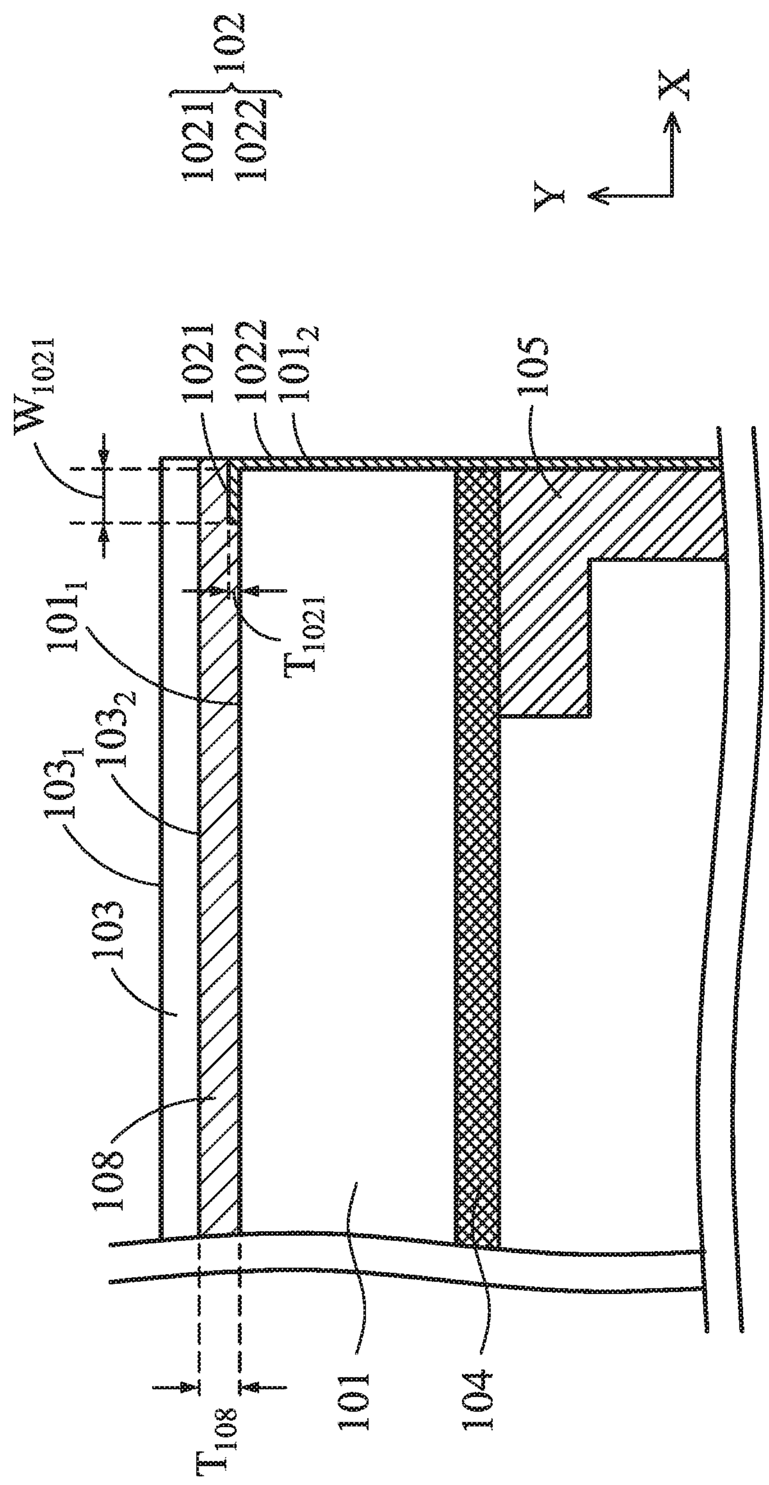
FIG. 6 is partial cross-sectional diagrams of the display device in accordance with an embodiment of the present disclosure.

Referring to FIG. 6, which is a partial cross-sectional diagram of the display device in accordance with other embodiments of the present disclosure. In order to make the viewing surface of the display device as flat as possible for a preferred visual experience, the top surface $\mathbf{103}_1$ of the optical film 103 is a substantially flat surface. In order to simplify the process, a lower surface $\mathbf{103}_2$ of the optical film 103 (i.e., a side of the optical film 103 is adjacent to the display panel 101) also is a substantially flat surface without any other flattening surface treatment.

In some embodiments, as shown in FIG. 6, the display penal further includes an adhesive layer 108 between the optical film 103 and the display panel 101. The adhesive layer 108 at least partially covers the top surface $\mathbf{101}_1$ of the display panel 101 and the first part 1021 of the light shielding component 102. The adhesive layer 108 has a thickness $T_{108}$ in the Y direction, and the maximum thickness $T_{108}$ is greater than the thickness $T_{1021}$ of the first part 1021 of the light shielding component 102. The thickness may be the maximum thickness in any of the cross-sectional images, in other words, the thickness may be the maximum thickness of the partial region of the adhesive layer 108 or the light shielding component 102 in the normal direction (for example, the Y direction) of the display panel. Since the maximum thickness $T_{108}$ is greater than the thickness $T_{1021}$, the adhesive layer 108 may be formed to a substantially flat top surface, and thus the optical film 103 attached to the adhesive layer 108 also may be a substantially flat top surface $\mathbf{103}_1$.

Figure 7:
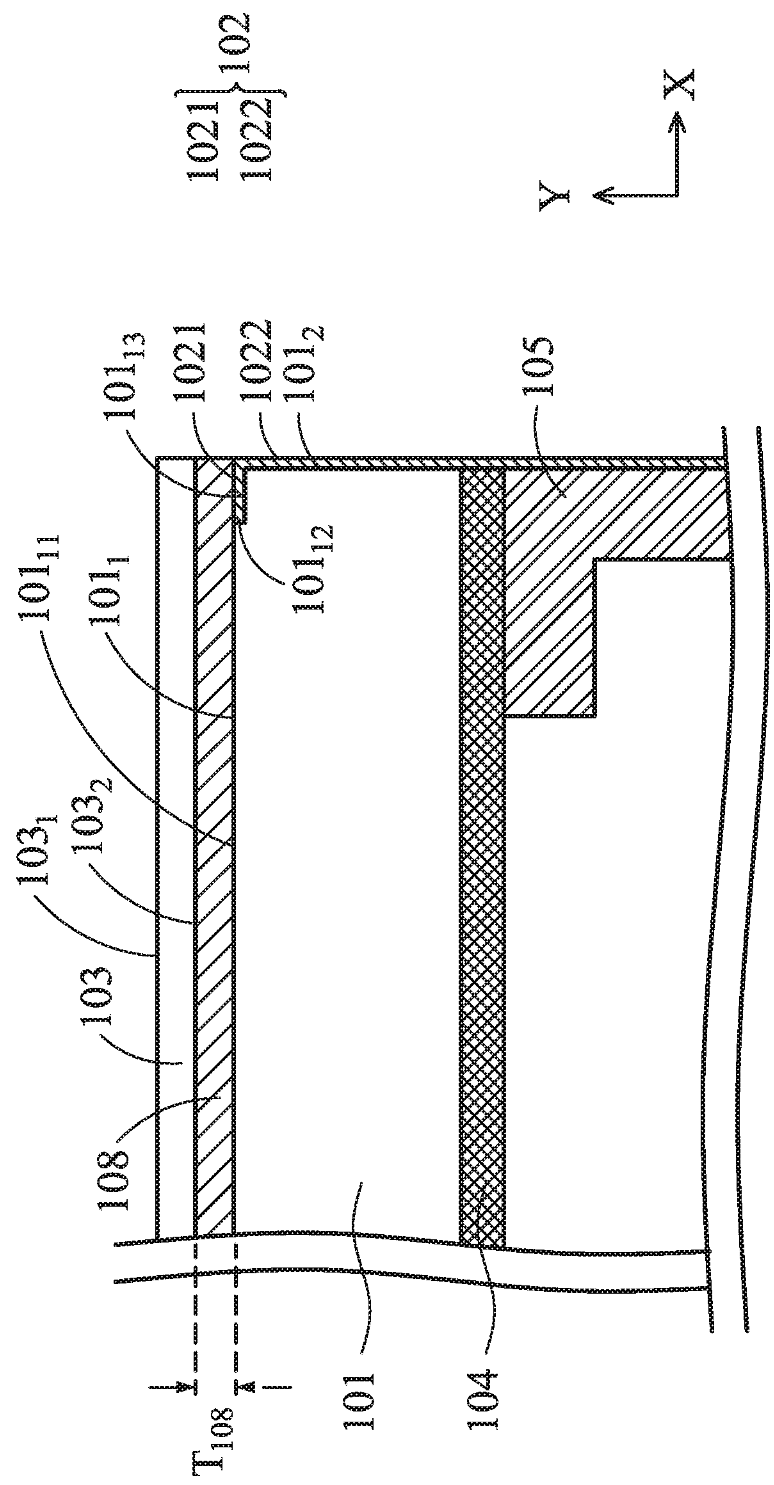
FIG. 7 is partial cross-sectional diagrams of the display device in accordance with an embodiment of the present disclosure.

FIG. 7 provides another aspect of the lower surface $\mathbf{103}_2$ of the optical film 103 that is a substantially flat surface. In this embodiment, the top surface $\mathbf{101}_1$ of the display panel 101 may include a surface $\mathbf{101}_{11}$, a surface $\mathbf{101}_{12}$ and a surface $\mathbf{101}_{13}$. The top surface of the first part 1021 of the light shielding component 102 is substantially aligned with the top surface $\mathbf{101}_1$ of the display panel 101. In other words, the top surface of the first part 1021 is substantially coplanar with the surface $\mathbf{101}_{11}$ of the top surface $\mathbf{101}_1$. As a result, the adhesive layer 108 and the optical film 103 are formed on the top surface $\mathbf{101}_1$ of the display panel 101 and the first part 1021 of the light shielding component 102, such that the lower surface $\mathbf{103}_2$ of the optical film 103 may also be a substantially flat surface.

In some embodiments, the adhesive layer 108 may include an optical clear adhesive (OCA), an optical clear resin (OCR), poly(vinyl butyral) (PVB) or other suitable adhesive material, but is not limited thereto.

Figure 8:
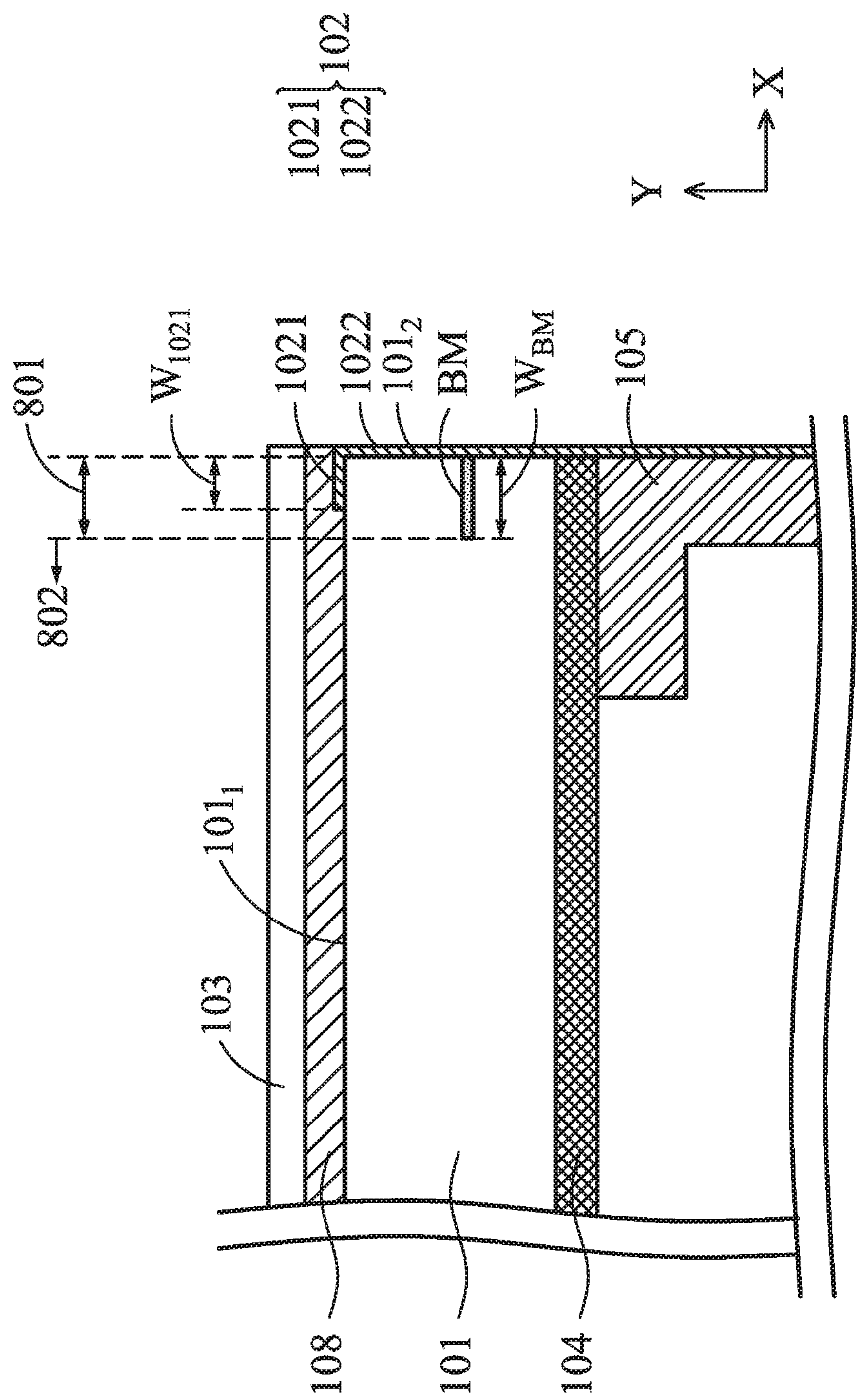
FIG. 8 is partial cross-sectional diagrams of the display device in accordance with an embodiment of the present disclosure.

Referring to FIG. 8, in some embodiments, a part of the display panel 101 displaying images is a display area 802, and other than the display area 802 is a non-display area 801. The non-display area 801 in a periphery of the display panel 101 of the display device may be disposed with a black matrix BM. When the display panel 101 is a liquid-crystal display panel (as shown in FIG. 3), the black matrix BM may be disposed between the color filter substrate 101*a* and the thin film transistor substrate 101*b*, and in the Y direction, the black matrix BM is disposed corresponding to metal traces or electronic components (not shown) in the non-display area 801, and thus the reflected light may be reduced. In some embodiments, the black matrix BM may be disposed between the color filter substrate 101*a* and the optical film 103 in the non-display area 801. The black matrix BM has a width $W_{BM}$. In some embodiments, the width $W_{BM}$ is greater than the width $W_{1021}$ of the first part 1021 of the light shielding component 102.

Figure 9:
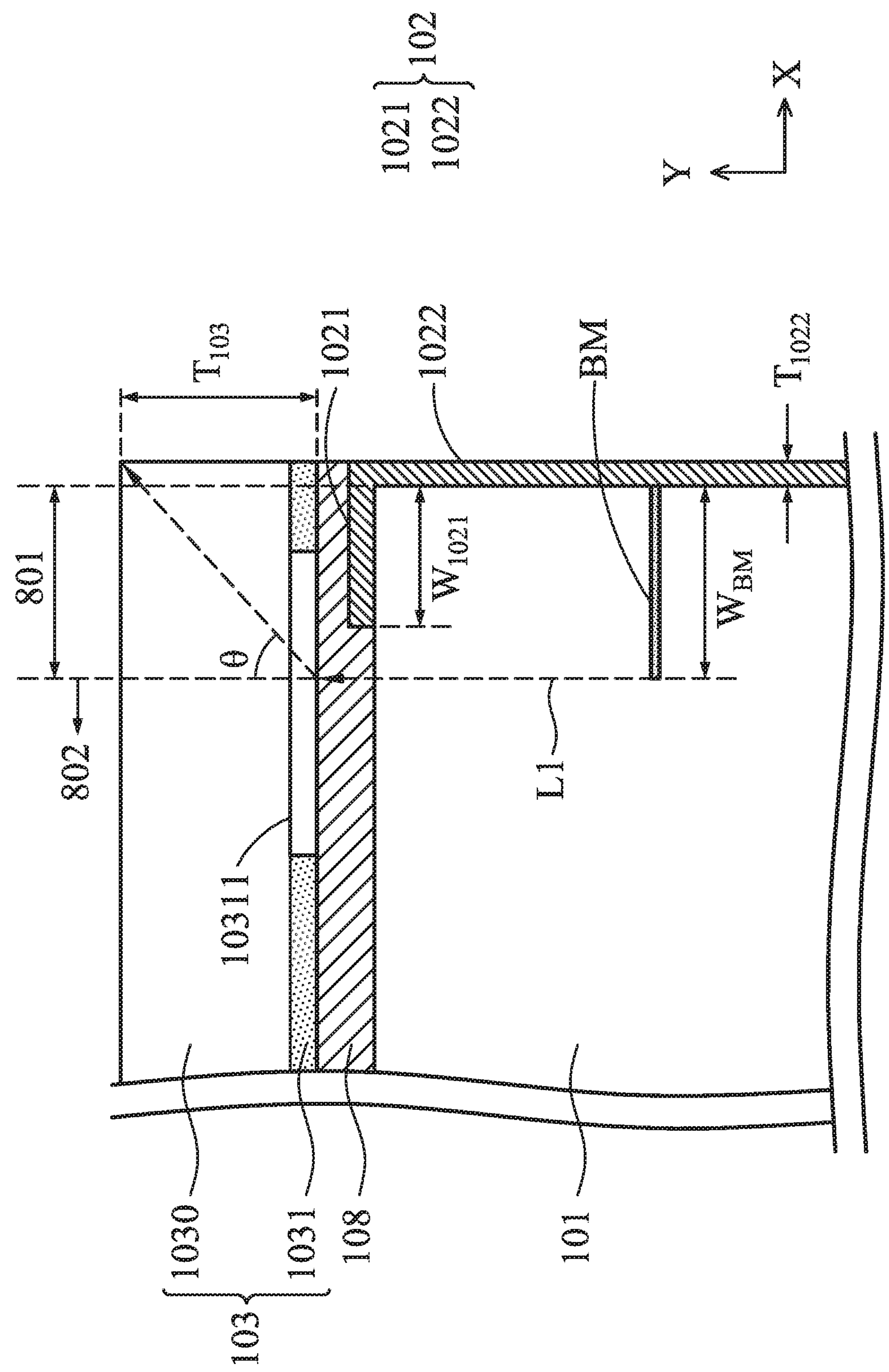
FIG. 9 is partial cross-sectional diagrams of the display device in accordance with an embodiment of the present disclosure.

Referring to FIG. 9, which is a partial cross-sectional diagram of the display device in accordance with other embodiments of the present disclosure. In some embodiments, the width $W_{BM}$ of the black matrix BM is greater than the width $W_{1021}$ of the first part 1021 of the light shielding component 102, and the optical film 103 includes a main body layer 1030 and a first microstructure layer 1031. The first microstructure layer 1031 is disposed between the main body layer 1030 and the display panel 101, and has a first microstructure area 10311. When the display device is viewed in a plan view (along the Y direction), the first microstructure area 10311 covers at least a border between the non-display area 801 and the display area 802. The setting range of the first microstructure area 10311 may be adjusted as needed. For example, in some embodiments, the first microstructure area 10311 may be extended in such a way that it is substantially adjacent to the edge of the optical film 103 or it is substantially aligned with the edge of the optical film 103.

Still referring to FIG. 9, when the display panel 101 is displaying or emitting, since the first microstructure area 10311 of the optical film 103 at least partially covers an interface between the non-display area 801 and the display area 802, at least part of the light of the display area, for example, a light L1, may be incident to the first microstructure area 10311. The first microstructure area 10311 may guide the light L1 to the upper side of the black matrix BM using the microstructure therein. That is, at least part of the light in the display area, such as the light L1, may be guided to the upper side of the non-display area 801 and/or the second part 1022 of the light shielding component 102. In some embodiments, the first microstructure area 10311 guides the part of the light of the display area, such as the light L1, to the non-display area 801 by means of refraction, and the refracted light has a refracted angle θ with the light L1. By guiding the part of the light of the display area to the non-display area 801, the non-display area 801 and/or the second part 1022 of the light shielding component 102 may also display an image, which allows the viewer to experience a borderless full-vision when the black matrix BM and the first part 1021 of the light shielding component 102 are viewed from the Y direction, or when used for a tiled display device, the obvious boundary line generated by the outer frame between the tiled units can be reduced, and the tiled display image is further integrated to increase the overall visual experience. In order to make the following figures more concise, and the non-display area 801 and the display area 802 will be omitted. The light L1 is only a schematic, and the first microstructure area 10311 at least partially overlapping the display area 802 may have the effect of refracting the light of the display area to the non-display area 801, so that the image only displayed on the display area 802 may be extended to display on the non-display area 801 and/or the second part 1022 of the light shielding component 102. The following embodiments may also have the same effect and will not be repeated.

Figure 10:
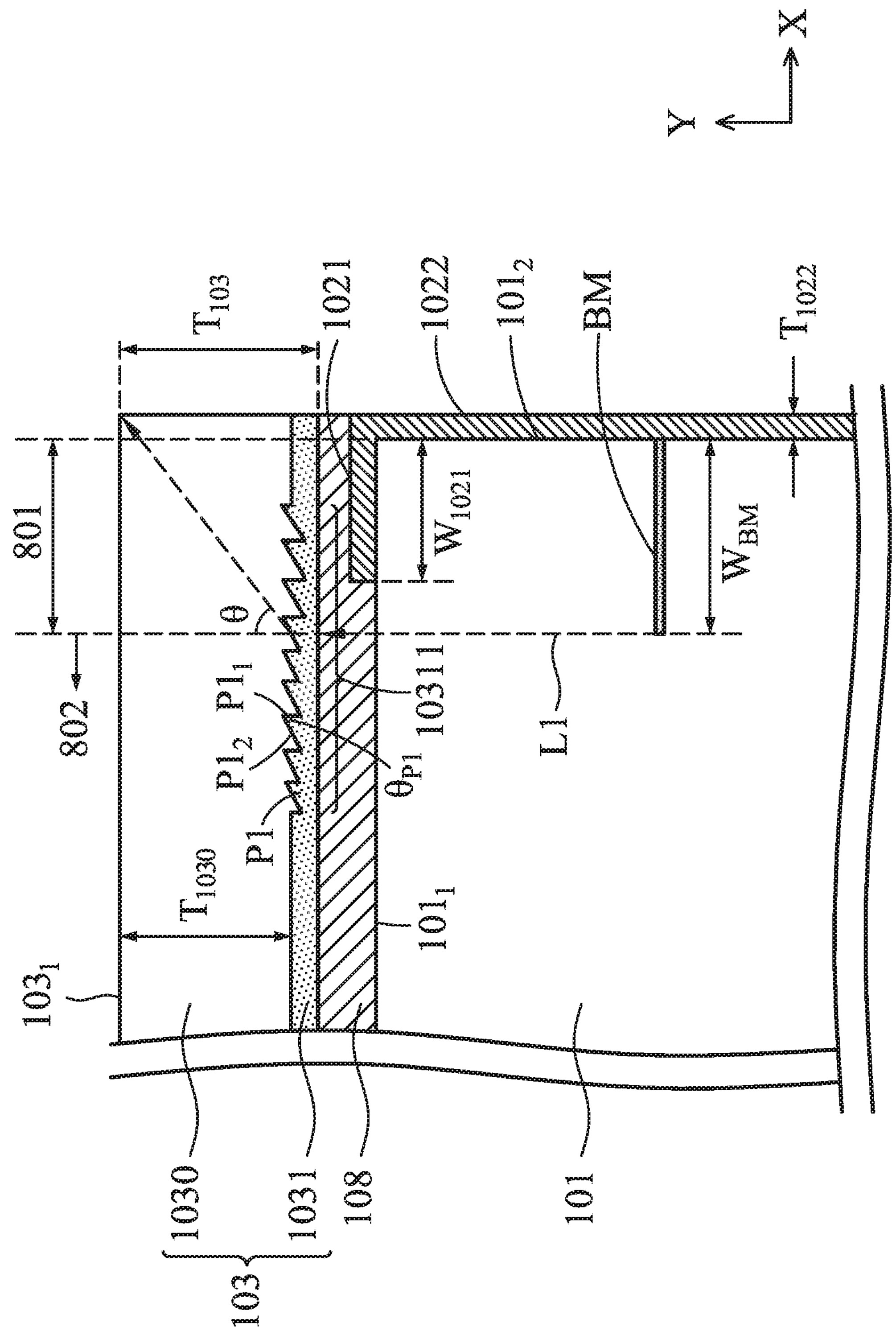
FIG. 10 is partial cross-sectional diagrams of the display device in accordance with an embodiment of the present disclosure.

Referring to FIG. 10, in some embodiments, the first microstructure area 10311 may have a plurality of first prisms P1 and the plurality of first prisms P1 refract the light L1 to the non-display area 801. In some embodiments, the microstructure in the first microstructure area 10311 may be a plurality of strip structures when viewing the display device from the Y direction. The shape of the first prisms P1 may be appropriately adjusted according to the actual conditions such as the refractive index of the selected material, the amplitude of the desired refraction or the like. In some embodiments, a refractive index $n_{1031}$ of the first microstructure layer 1031 in the optical film 103 is greater than a refractive index $n_{1030}$ of the main body layer 1030, and the refractive index $n_{1030}$ of the main body layer 1030 is greater than the refractive index of the air. At this time, at least one of the first prisms P1 may have a first prism surface $P1_1$ and a second prism surface $P1_2$, and the first prism surface $P1_1$ is closer to the side surface $101_2$ of the display panel 101 than the second prism surface $P1_2$. The first prism surface $P1_1$ is substantially perpendicular to the top surface $101_1$ of the display panel 101, and an angle between the second prism surface $P1_2$ and the first prism surface $P1_1$ is first angle $\theta_{P1}$. The first angle $\theta_{P1}$ is an acute angle. In some embodiments, the first angle $\theta_{P1}$ adjacent to the display area 802 is greater than the first angle $\theta_{P1}$ away from the display area.

The light L1 incident on the first microstructure area 10311 may be refracted to the non-display region 801 by the structure described above. In some embodiments, if the non-display area 801 of the display device or even the edge of the display device is not easily perceived by the viewer, the structure of the first prisms P1 or the first angles $\theta_{P1}$ may be adjusted to allow the light L1 to reach the edge of the top surface of the optical film 103 via a refracted angle θ. In other embodiments, the thickness $T_{1030}$ of the main body layer 1030 can be adjusted to the image displayed on the display area 802 be extended to display on the non-display area 801, but not limited thereto.

The microstructure in the first microstructure area 10311 may also adjust the slope of the second prism surface $P1_2$ along with the distance from the side surface $101_2$ of the display panel 101. That is, the farther away from the non-display area 801, the slope of the second prism surface $P1_2$ is smoother, as long as the part of the light of the display area 802 may be guided to the non-display area 801. The described microstructure in the first microstructure area 10311 is only example, but not limited thereto. For example, when the first microstructure area 10311 is viewed from the top, it may be a strip structure, a plurality of independent block structures, or a plurality of hollow patterned structures as long as at least part of the images displayed on the display area 802 may be extended to display on the non-display area 801 by the difference in refractive index, the difference in the scattering rate, the difference in the diffusion rate, and the like.

Figure 11:
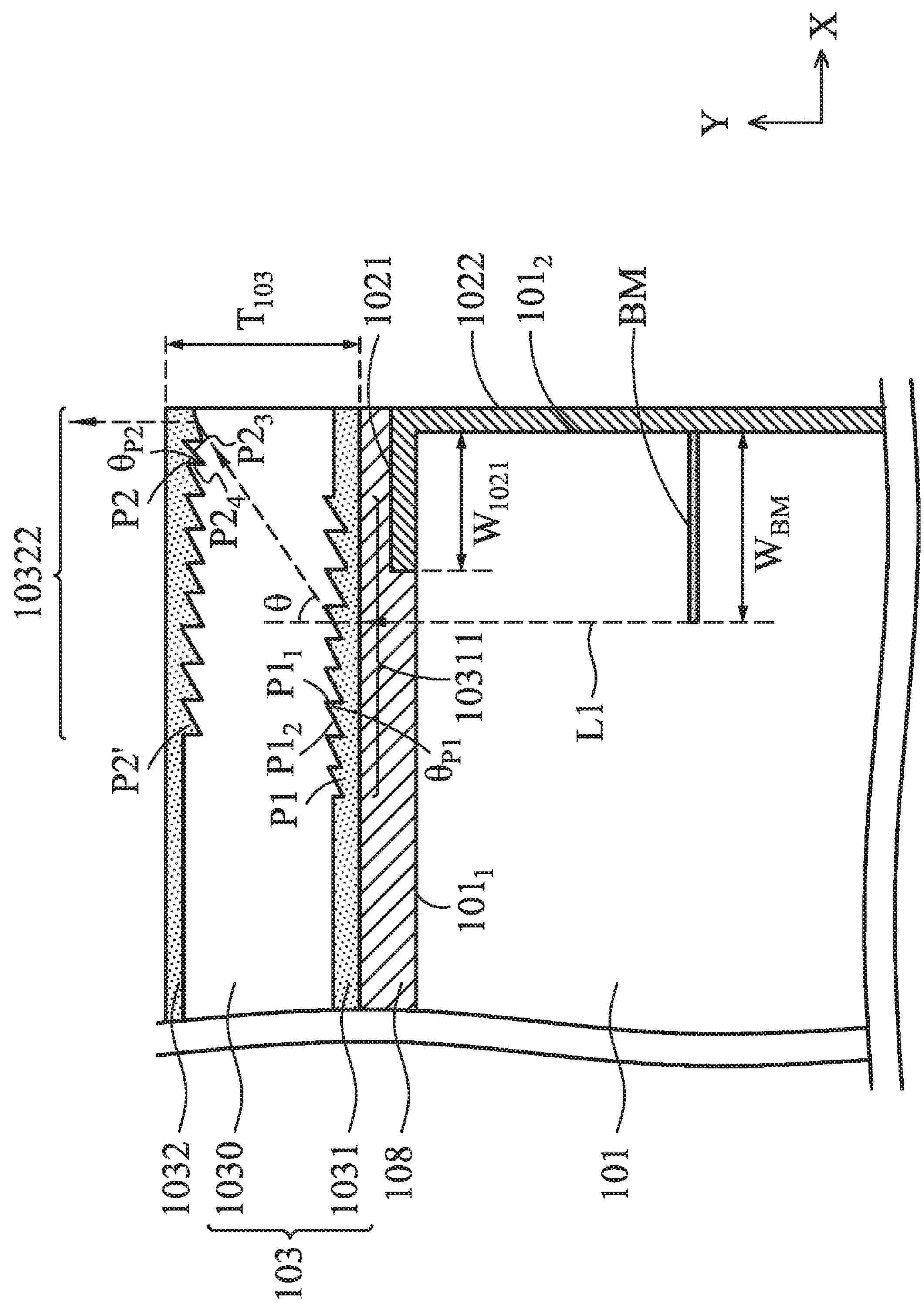
FIG. 11 is partial cross-sectional diagrams of the display device in accordance with an embodiment of the present disclosure.

Referring to FIG. 11, in order to make the image displayed on the non-display area 801 clearer and/or brighter, the light guided via the first microstructure area 10311 to the non-display area 801 may be guided substantially toward the viewing surface of the display device by other microstructures to improve the visual effects of the user at the front viewing position. In some embodiments, in addition to the main body layer 1030 and the first microstructure layer 1031, the optical film 103 further includes a second microstructure layer 1032 disposed on a side of the main body layer 1030 away from the display panel 101. The second microstructure layer 1032 has a second microstructure area 10322 therein, and the second microstructure area 10322 may have a plurality of second prisms P2. When the display device is viewed from the Y direction, the second prisms P2 has a plurality of strip structures substantially parallel to the side surface $101_2$ of the display panel 101. The setting range of the second microstructure area 10322 may be adjusted as needed, such as depending on how much range of light that is guided via the first microstructure area 10311 to be refracted. In some embodiments, in order to guide the part of the light of the display area to the non-display area 801 (for example, after the light L1 at the edge of the black matrix BM is guided via the first microstructure area 10311 and the second microstructure area 10322 to the non-display area 801), the light L1 may be emitted from the edge of the display device in a direction that is substantially perpendicular to the top surface of the display panel 101. The edge of the second microstructure area 10322 (the right side of FIG. 11) may be adjacent to or substantially aligned with the edge of the optical film 103. In other embodiments, the second microstructure area 10322 may be disposed corresponding to the first microstructure area 10311 such that part of the light of the display area enters the optical film 103, and the light guided via the first microstructure area 10311 may be guided in such a way that it is emitted in a direction that is substantially parallel to the light L1 or in a direction that is substantially perpendicular to the top surface $101_1$ of the display panel 101. In some embodiments, the edge of the first microstructure area 10311 and/or the edge of the second microstructure area 10322 may be substantially aligned with the edge of the optical film 103, but it is not limited thereto.

The shape or material of the second prisms P2 in the second microstructure area 10322 may also be adjusted to suit actual needs. For example, as shown in FIG. 11, in some embodiments, the materials of the first microstructure layer 1031 and the second microstructure layer 1032 may be the same. In some embodiments, a surface of a part of the second prisms P2 may be disposed to parallel to the second prism surface $P1_2$ of the first prisms P1. For example, at least one of the second prisms P2 has a third prism surface $P2_3$ and a fourth prism surface $P2_4$. The third prism surface $P2_3$ is closer to the side surface $101_2$ of the display panel 101 than the fourth prism surface $P2_4$, and the fourth prism surface $P2_4$ is substantially perpendicular to the top surface $101_1$ of the display panel 101. There is a second angle $\theta_{P2}$ between the third prism surface $P2_3$ and the fourth prism surface $P2_4$, and the first angle $\theta_{P1}$ may be substantially the same as the second angle $\theta_{P2}$. In some embodiments, the materials of the first microstructure layer 1031 and the second microstructure layer 1032 may also be different as long as the part of the light of the display area is guided to the non-display area 801. In some embodiments, the angle between the third prism surface $P2_3$ and the fourth prism surface $P2_4$ is different from second angle $\theta_{P2}$ of the second prisms P2, and a part of the third prism surface $P2_3$ is not parallel to the second prism surface $P1_2$. In some embodiments, the second angle $\theta_{P2}$ of the second prisms P2' adjusted to the display area 802 are greater than the second angle $\theta_{P2}$ of the second prisms P2 away from the display area.

Figure 12:
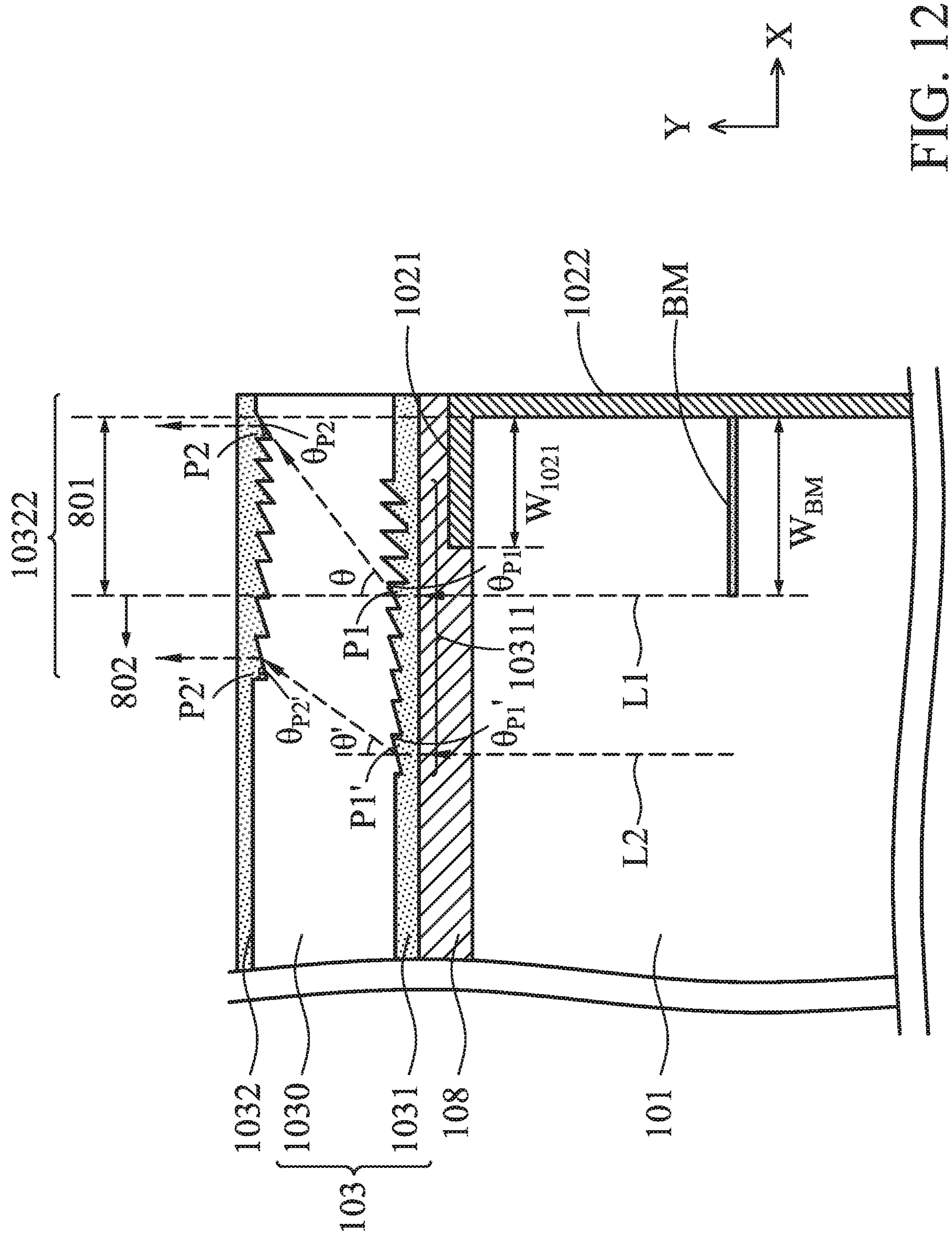
FIG. 12 is partial cross-sectional diagrams of the display device in accordance with an embodiment of the present disclosure.

Referring to FIG. 12, in some embodiments, the first angle $\theta_{P1}$ of at least part of the first prisms P1 in the first microstructure area 10311 may be different from each other. For example, the first angles $\theta_{P1'}$ relatively adjusted to the display area 802 are greater than the first angles $\theta_{P1}$ away from the display area 802. In some embodiments, the first prism P1' of the leftmost side (closest to the inside of the display panel 101) in the first microstructure area 10311 has a first angle $\theta_{P1'}$ greater than a first angle $\theta_{P1}$ of the first prism P1 on which the light L1 be incident. In some embodiments, the second angle $\theta_{P2}$ of at least part of the second prisms P2 may be different from each other. In some embodiments, the second angles $\theta_{P2'}$ of the second prisms P2 in the second microstructure area 10322 relatively adjusted to the display area 802 are greater than the second angles $\theta_{P2}$ of the second prisms P2 relatively far away from the display area 802. Therefore, when another light L2 is incident on the first prisms P1', its refraction angle θ' will be smaller than the refraction angle θ of the light L1, and this different design may allow the image refracted to the non-display area 801 from display area 802 has the different extension effects. In some embodiments, at least part of a plurality of patterned structures in the first microstructure area 10311 may be different from each other, and the difference may be, for example, a distance, a width, or an area, but it is not limited thereto.

The design of the first microstructure area 10311 or the second microstructure area 10322 is not limited to change of the angle of the prism described above, and may be achieved by, for example, adjusting the density of the prism, the width of the prism, or the like. According to the structure described above, the amount of image deformation at the edge region of the display device may be altered, so that the viewer barely perceives the boundary of the deformation region of the edge of the image.

When the first angles $\theta_{P1}$ of the first prisms P1 of the first microstructure area 10311 in the display area 802 have a different design (for example, a different angle) than those in the non-display area 801, the second angles $\theta_{P2}$ of the second prisms P2 of the second microstructure area 10322 are also adjusted correspondingly so that the light guided via the first microstructure area 10311 may still be substantially emitted in perpendicular to the top surface $\mathbf{101}_1$ of the display panel 101.

Figure 13:
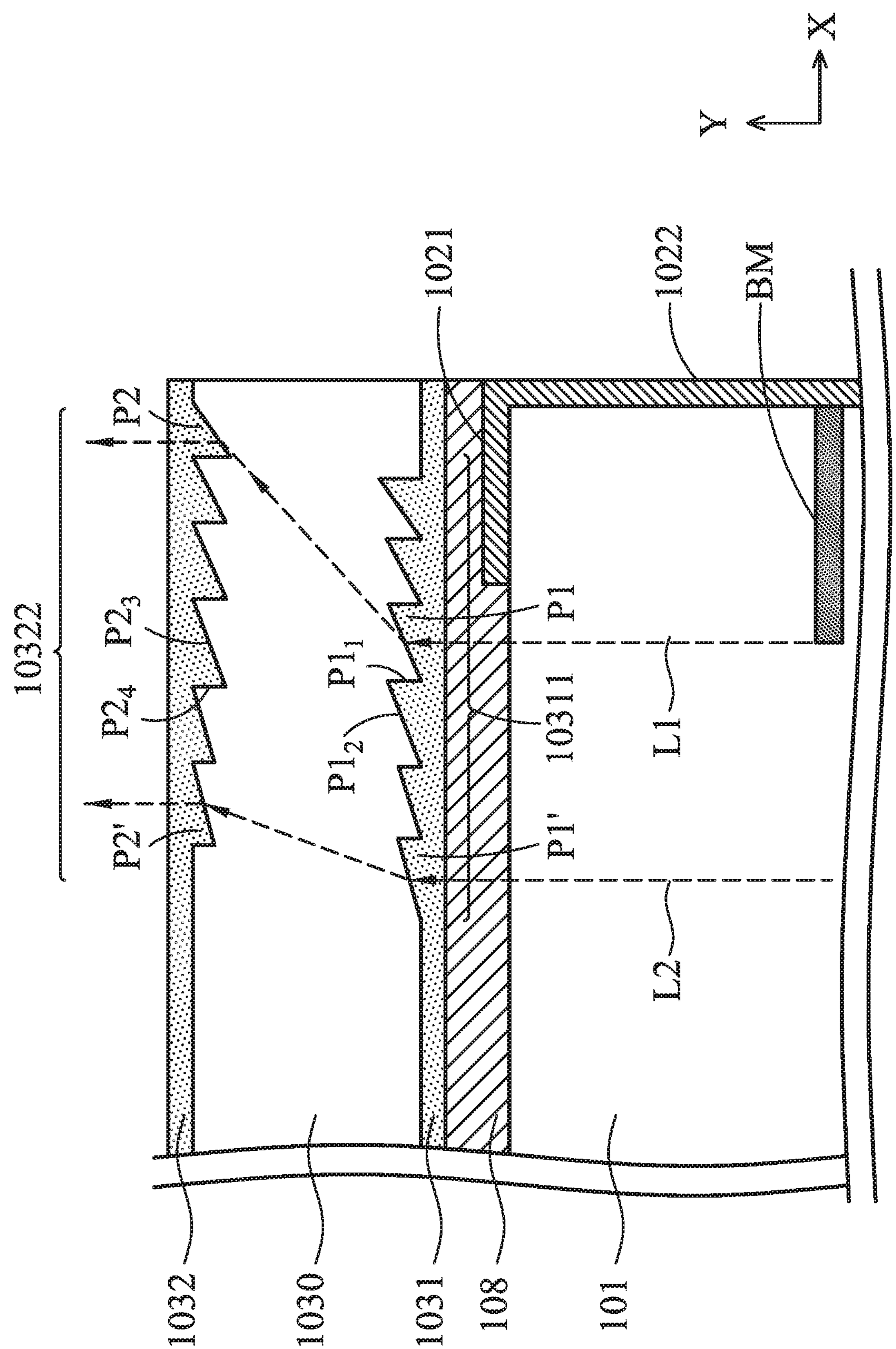
FIG. 13 is partial cross-sectional diagrams of the display device in accordance with an embodiment of the present disclosure.

Referring to FIG. 13, a light L2 is incident on a leftmost first prism P1' in the first microstructure area 10311, and is refracted to be incident on a second prism P2' of the second microstructure area 10322. In some embodiments, the second prism P2' may also be the leftmost second prisms in the second microstructure area 10322. The second prism P2' may be regarded as a prism corresponding to the first prism P1', and the corresponding prisms have parallel surfaces which are not perpendicular to the top surface $\mathbf{101}_1$ of the display panel 101. In some embodiments, the second prism surface $P\mathbf{1}_2$ of the first prism P1' is substantially parallel to the second prism P2' of the third prism surface $P\mathbf{2}_3$.

The optical film 103 may be fabricated using any suitable means. For example, when the optical film 103 has the main body layer 1030, the first microstructure layer 1031, and the second microstructure layer 1032, the first microstructure layer 1031 may be formed first with the desired microstructure pattern on its surface. Then, the main body layer 1030 is obtained by, for example, forming the resin layer thereon and curing. Subsequent to the desired microstructure pattern being formed on the desired area on the surface of the main body layer 1030, the second microstructure layer 1032 is formed in a similar manner on the surface of the main body layer 1030. The microstructure pattern may be formed by various suitable methods such as welding, bonding, coating, printing, injection molding, etching, and laser processing. In some embodiments, the optical film 103 may be selectively provided with the first microstructure layer 1031 or the second microstructure layer 1032, or selectively add other layers to make it a multilayered structure having multi-functionality.

The thickness $T_{1030}$ of the optical film 103 may be adjusted according to the refractive indices of the selected main body layer 1030, the first microstructure layer 1031 and the second microstructure layer 1032, so that the final light-emitting direction is as desired. In some embodiments, the thickness $T_{1030}$ of the optical film 103 may be 0.5 mm-10 mm, or 1 mm-3 mm. In some embodiments, the thickness of the main body layer 1030 may be 90% or more of the entire the thickness $T_{1030}$ of the optical film 103. Further, each of the layers may be a single layer or multiple layers. For example, the main body layer 1030 may be a two-layer structure having a different refractive index or a hollow structure including a plurality of air regions. The difference in refractive index between the layers may be 0.01-0.6, or may be 0.05-0.4.

In some embodiments, a surface treatment layer such as a hard coating layer, an anti-glare layer, a phase difference film, an anti-reflection layer, a charged protection layer, and an anti-pollution layer may be provided on a side of the optical film 103 facing the viewer. In some embodiments, the surface treatment layer may be atomized to have a haze value of 10% or more, preferably 10% to 40%, to reduce visual discomfort caused by the interaction between the ambient light and the light emitting through the microstructure layer. In some embodiments, different areas may have different haze values, for example, the haze value of the display area 802 is less than the haze value of the non-display area 801, so that the display quality of the display area 802 may be maintained.

The haze value may be the transmittance percentage of a scattered light with respect to the transmittance of the total transmitted light through a measured object. The haze value may be measured using a hazemeter (NDH-5000SP). The haze value may be measured by the following: when the light is transmitted through the measured object, it will be incident on the integrating sphere. In this process, the light is separated into a scattered light (DT) and a parallel light (PT) by the measured object, and the lights are reflected into the integrating sphere, and then collected by a light receiving device. The haze value can be obtained by measuring the collected light. The haze value is defined as the percentage of the scattered light to the total transmitted light (the haze value (%)=100×DT/TT), wherein the total transmitted light (TT) is the sum of the scattered light (DT) and the parallel light (PT).

To summarize the above, the present disclosure provides a display device including a display panel, a light shielding component and an optical film. The display device may reduce the light leakage at the edge of the display device by covering the light shielding component on the top surface of the display panel, or increase the durability of the light shielding component by covering the optical film on the interface between the light shielding component and the top surface of the display panel. In some cases, the light shielding component may also serve as a support member, so that the display device may be directly tiled and maintained with a certain strength without a metal front frame, and thereby reducing the width of the seams between the display devices. In addition, the width of the non-display area in the peripheral of the display device may be reduced by the microstructure in the optical film, so that the tiled display device has a more integrated screen.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. In addition, the features of the various embodiments can be used in any combination as long as they do not depart from the spirit and scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes an individual embodiment, and the claimed scope of the present disclosure also includes the combinations of the claims and embodiments. The scope of protection of present disclosure is subject to the definition of the scope of the appended claims.

What is claimed is:

1. A display device, comprising:

a display panel, having a top surface and a side surface adjacent to the top surface;

a light shielding component, having a first part and a second part, wherein the first part is disposed on the top surface of the display panel, and the second part is disposed on the side surface of the display panel; and an optical film, at least covering a border between the top surface of the display panel and the first part of the light shielding component, wherein the optical film comprises a first microstructure layer, a second microstructure layer and a main body layer, and the first microstructure layer is disposed between the main body layer and the display panel, the first microstructure layer has a first microstructure area, and the second microstructure layer has a second microstructure area, and an edge of the second microstructure area is closer to an edge of the optical film than an edge of the first microstructure area, wherein a width of the first part of the light shielding component is less than 1 mm.

2. The display device as claimed in claim 1, wherein a material of the light shielding component comprises a metal film, a Mylar film, a metal-containing Mylar film, or a combination thereof.

3. The display device as claimed in claim 1, wherein the optical film completely covers the top surface of the display panel and the first part of the light shielding component.

4. The display device as claimed in claim 3, further comprising:

a support member, disposed on a side of the display panel away from the top surface;

a back frame, disposed adjacent to the support member; and a fixing mechanism, the support member and the back frame fixed each other by the fixing mechanism.

5. The display device as claimed in claim 4, wherein the support member is a transparent support member.

6. The display device as claimed in claim 4, wherein the second part of the light shielding component is extended to cover the back frame.

7. The display device as claimed in claim 4, wherein the optical film is extended to cover the second part of the light shielding component.

8. The display device as claimed in claim 1, further comprising an adhesive layer, wherein the adhesive layer is disposed between the optical film and the display panel, and a thickness of the adhesive layer is greater than a thickness of the light shielding component.

9. The display device as claimed in claim 8, wherein a top surface of the first part of the light shielding component is substantially coplanar with the top surface of the display panel.

10. The display device as claimed in claim 1, wherein a refractive index of the first microstructure layer is greater than a refractive index of the main body layer, and the refractive index of the main body layer is greater than the refractive index of air.

11. The display device as claimed in claim 1, wherein the main body layer is disposed between the first microstructure layer and the second microstructure layer.

12. The display device as claimed in claim 1, wherein the first microstructure area has a plurality of first prisms.

13. The display device as claimed in claim 12, wherein at least one of the first prisms has a first prism surface and a second prism surface, an angle between the first prism surface and the second prism surface is a first angle.

14. The display device as claimed in claim 1, wherein the second microstructure area has a plurality of second prisms.

15. The display device as claimed in claim 14, wherein at least one of the second prisms has a third prism surface and a fourth prism surface, an angle between the third prism surface and the fourth prism surface is a second angle.

16. The display device as claimed in claim 15, wherein the first microstructure area has a plurality of first prisms, and at least one of the first prisms has a first prism surface and a second prism surface, an angle between the first prism surface and the second prism surface is a first angle, wherein the first angle is substantially the same as the second angle.

17. The display device as claimed in claim 1, further comprising a black matrix disposed at a periphery of the display panel, wherein a width of the black matrix is greater than the width of the first part of the light shielding component.

* * * * *